(12) United States Patent
Chen

(10) Patent No.: US 11,218,852 B2
(45) Date of Patent: Jan. 4, 2022

(54) COMMUNICATION MODE SWITCHING METHOD, NETWORK SIDE DEVICE, AND TERMINAL DEVICE

(71) Applicant: Huawei Technologies Co., Ltd., Shenzhen (CN)

(72) Inventor: Xiaoguang Chen, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 16/725,283

(22) Filed: Dec. 23, 2019

(65) Prior Publication Data

US 2020/0137538 A1 Apr. 30, 2020

Related U.S. Application Data

(63) Continuation of application No. PCT/CN2018/092295, filed on Jun. 22, 2018.

(30) Foreign Application Priority Data

Jun. 23, 2017 (CN) .......................... 201710486955.6

(51) Int. Cl.
*H04W 4/40* (2018.01)
*H04W 76/11* (2018.01)
*H04W 4/20* (2018.01)
*H04W 24/10* (2009.01)
*H04W 92/18* (2009.01)

(52) U.S. Cl.
CPC .............. *H04W 4/40* (2018.02); *H04W 4/20* (2013.01); *H04W 24/10* (2013.01); *H04W 76/11* (2018.02); *H04W 92/18* (2013.01)

(58) Field of Classification Search
CPC ......... H04W 4/40; H04W 4/20; H04W 76/11; H04W 24/10; H04W 92/18

USPC ........................................................ 370/329
See application file for complete search history.

(56) References Cited

U.S. PATENT DOCUMENTS

| 9,532,360 B2 * | 12/2016 | Chai ...................... H04W 76/30 |
| 9,883,541 B2 * | 1/2018 | Liu ......................... H04W 76/14 |
| 2010/0279672 A1 * | 11/2010 | Koskela ................ H04W 36/30 |
| | | 455/418 |

(Continued)

FOREIGN PATENT DOCUMENTS

| CN | 106559443 A | 4/2017 |
| CN | 106559732 A | 4/2017 |

(Continued)

OTHER PUBLICATIONS

XP051082362, R2-162289, Huawei, et al., "Configuration of PC5 and/or Uu for V2V transport," 3GPP TSG-RAN WG2 Meeting #93bis, Dubrovnik, Croatia, Apr. 11-15, 2016, 6 pages.
XP051095341, R2-163815, Huawei, et al., "Summary of [93bis#24][LTEV2V] Tx PC5 and Uu path switch for V2V," 3GPP TSG-RAN WG2 Meeting #94, Nanjing, China, May 23-27, 2016, 24 pages.

(Continued)

*Primary Examiner* — Mong-Thuy T Tran
(74) *Attorney, Agent, or Firm* — Conley Rose, P.C.

(57) ABSTRACT

A communication mode switching method, a network side device, and a terminal device includes a communication mode of the second vehicle to everything (V2X) service is switched from a first communication mode to the second communication mode for scheduling a first V2X service of a radio resource to be transmitted using the first communication mode.

20 Claims, 5 Drawing Sheets

(56) References Cited

U.S. PATENT DOCUMENTS

| 2013/0235847 | A1* | 9/2013 | Li ................ H04W 36/0022 370/331 |
|---|---|---|---|
| 2017/0150421 | A1 | 5/2017 | Kuge et al. |
| 2017/0150490 | A1 | 5/2017 | Chen et al. |
| 2018/0242115 | A1 | 8/2018 | Kim et al. |
| 2019/0150082 | A1* | 5/2019 | Kedalagudde .......... H04W 4/46 370/329 |
| 2019/0174286 | A1* | 6/2019 | Guo ...................... H04W 4/00 |
| 2019/0174344 | A1* | 6/2019 | Karella ................ H04L 43/062 |

FOREIGN PATENT DOCUMENTS

| CN | 107295454 A | 10/2017 |
|---|---|---|
| EP | 3439394 A1 | 2/2019 |
| WO | 2015170690 A1 | 11/2015 |
| WO | 2015200102 A1 | 12/2015 |
| WO | 2017030348 A1 | 2/2017 |
| WO | 2017036510 A1 | 3/2017 |
| WO | 2017049975 A1 | 3/2017 |
| WO | 2017050144 A1 | 3/2017 |

OTHER PUBLICATIONS

XP051095651, R2-163887, Potevio, "PC5 measurement for V2V path switch between Uu and PC5," 3GPP TSG RAN WG2 Meeting #94, Nanjing, China, May 23-27, 2016, 4 pages.

XP051105075, R2-163645, CATT, "Tx PC5 and Uu Path Selection for V2V," 3GPP TSG RAN WG2 Meeting #94, Nanjing, China, May 23-27, 2016, 4 pages.

Gallo, L., et al., "Resouice Allocation for LTE-Direct Broadcast of Periodic Vehicular Safety Messages," Research Report, RR-13-290, Feb. 26, 2014, 26 pages.

"3rd Generation Partnership Project; Technical Specification Group Services and System Aspects; Architecture enhancements for V2X services (Release 14)," 3GPP TS 23.285, V14.3.0, Jun. 12, 2017, 35 pages.

"3rd Generation Partnership Project; Technical Specification Group Core Network and Terminals; User Equipment (UE) to V2X control function; protocol aspects; Stage 3 (Release 14)," 3GPP TS 24.386, V14.1.0, Jun. 2017, 33 pages.

* cited by examiner

COMMUNICATION MODE SWITCHING METHOD, NETWORK SIDE DEVICE, AND TERMINAL DEVICE

CROSS-REFERENCE TO RELATED APPLICATIONS

This application is a continuation application of International Patent Application No. PCT/CN2018/092295, filed on Jun. 22, 2018, which claims priority to Chinese Patent Application No. 201710486955.6, filed on Jun. 23, 2017. The disclosures of the aforementioned applications are hereby incorporated by reference in their entireties.

TECHNICAL FIELD

This application relates to the wireless communications field, and in particular, to a communication mode switching method, a network side device, and a terminal device.

BACKGROUND

Vehicle to everything (V2X) is a large-scale system network in which wireless communication and information exchange are performed between a vehicle and another device based on an intra-vehicle network, an inter-vehicle network, and in-vehicle mobile internet according to an agreed communications protocol and an agreed data exchange standard. The internet of vehicles is an integrated network that can implement intelligent transportation management, an intelligent dynamic information service, and intelligent vehicle control, and is a typical application of an internet of things technology in the field of transportation systems.

A PC5 communication mode in which a PC5 interface is used for communication supports network coverage and no network coverage. Therefore, a communication mode usually used for communication between V2X devices is the PC5 communication mode. Because the communication mode usually used for communication between internet of vehicles devices is the PC5 communication mode, an existing method for scheduling an air interface resource of the internet of vehicles mainly aims for scheduling of a PC5 interface resource. The PC5 interface resource can be scheduled in a base station coverage case and a no base station coverage case. In the no base station coverage case, the internet of vehicles device may perform time synchronization using a global navigation satellite system (GNSS), and implement scheduling and interface management of V2V communication using a distributed scheduling technology in vehicle to vehicle (V2V) communication. In the base station coverage case, a radio base station in a Long-Term Evolution (LTE) system may be used to assist in scheduling and interface management of V2V communication.

Because the PC5 communication mode is short-distance communication, and is limited by a quantity of PC5 interface resources, even if a base station participates in scheduling, in a range in which communication can be performed in the PC5 communication mode, a maximum access quantity of terminal devices that can be allowed to access a V2X network is also extremely limited. At a relatively busy or congested crossroad in a city, if the PC5 interface is used for communication, resource congestion, insufficiency of bandwidth, deterioration of signal quality, or the like in the V2V communication may be caused by the limited quantity of PC5 interface resources.

SUMMARY

This application provides a communication mode switching method, a network side device, and a terminal device, to reduce a case caused by a limited quantity of PC5 interface resources in V2V communication such as resource congestion, insufficiency of bandwidth, or deterioration of signal quality.

According to a first aspect, this application provides a communication mode switching method, and the method includes receiving a measurement report sent by a first terminal device, if the measurement report includes event indication information, determining a second V2X service that is of a second terminal device and that needs to be switched from a first communication mode to a second communication mode, where the event indication information is used to indicate that a radio resource of the first communication mode cannot meet a transmission requirement of transmitting a first V2X service by the first terminal using the first communication mode, and the second communication mode is different from the first communication mode, and sending a mode switching indication to a V2X control function, or sending a first update authorization parameter to the second terminal device, where the mode switching indication is used to indicate the V2X control function to switch a communication mode of the second V2X service of the second terminal device to the second communication mode, and the first update authorization parameter is used to indicate the second terminal device to switch the communication mode of the second V2X service to the second communication mode.

With reference to the first aspect, in a first possible implementation of the first aspect, the mode switching indication includes a device identifier of the second terminal device, a service identifier of the second V2X service, and a first switching command. The first switching command is used to indicate to switch the communication mode of the second V2X service from the first communication mode to the second communication mode.

With reference to the first possible implementation of the first aspect, in a second possible implementation of the first aspect, the mode switching indication further includes a switching identifier. The switching identifier is used to indicate a switching record, and the switching record includes the device identifier of the second terminal device, the service identifier of the second V2X service, and the first switching command.

With reference to any one of the first aspect or the first or the second possible implementation of the first aspect, in a third possible implementation of the first aspect, after the sending a mode switching indication to a V2X control function, or sending a first update authorization parameter to the second terminal device, the method further includes, if a predetermined condition is met, sending a mode restoration indication to the V2X control function, or sending a second update authorization parameter to the second terminal device, where the mode restoration indication is used to indicate the V2X control function to restore the communication mode of the second V2X service to the first communication mode, and the second update authorization parameter is used to indicate the second terminal device to switch the communication mode of the second V2X service back to the first communication mode.

With reference to the third possible implementation of the first aspect, in a fourth possible implementation of the first aspect, the mode restoration indication includes the device identifier of the second terminal device, the service identifier of the second V2X service, and a second switching command. Alternatively, the mode restoration indication includes the switching identifier.

With reference to any one of the third or the fourth possible implementation of the first aspect, in a fifth possible implementation of the first aspect, before the sending a mode switching indication to a V2X control function, the method further includes determining detection duration in which the communication mode of the second V2X service is switched from the first communication mode to the second communication mode, and if the predetermined condition is met, the sending a mode restoration indication to the V2X control function, or sending a second update authorization parameter to the second terminal device includes, if data of a first V2X service is not transmitted for a time exceeding the detection duration, sending the mode restoration indication to the V2X control function, or sending the second update authorization parameter to the second terminal device.

With reference to any one of the first aspect or the first to the fifth possible implementations of the first aspect, in a sixth possible implementation of the first aspect, the first communication mode is a PC5 communication mode, and the second communication mode is a Uu communication mode, or the first communication mode is a Uu communication mode, and the second communication mode is a PC5 communication mode.

With reference to any one of the first aspect or the first to the sixth possible implementations of the first aspect, in a seventh possible implementation of the first aspect, the first terminal device and the second terminal device are a same terminal device, or the first V2X service and the second V2X service are a same service.

With reference to any one of the first aspect or the first to the seventh possible implementations of the first aspect, in an eighth possible implementation of the first aspect, the first update authorization parameter includes a mode indication, and the mode indication is used to indicate, to an upper-layer application of the second terminal device, that the communication mode of the second V2X service is switched to the second communication mode.

According to a second aspect, this application provides another communication mode switching method, and the method includes obtaining a mode switching indication, determining, based on information included in the mode switching indication, a second V2X service that needs to be switched from a first communication mode to a second communication mode, and a second terminal device to which the second V2X service belongs, and sending a first update authorization parameter to the second terminal device, where the first update authorization parameter is used to indicate the second terminal device to switch a communication mode of the second V2X service from the first communication mode to the second communication mode.

With reference to the second aspect, in a first possible implementation of the second aspect, the determining, based on information included in the mode switching indication, a second V2X service that needs to be switched from a first communication mode to a second communication mode, and a second terminal device to which the second V2X service belongs includes determining the second terminal device based on a device identifier obtained from the mode switching indication, determining the second V2X service based on a service identifier obtained from the mode switching indication, and determining the second communication mode based on a first switching command obtained from the mode switching indication.

With reference to the first possible implementation of the second aspect, in a second possible implementation of the second aspect, the method further includes obtaining a switching identifier from the mode switching indication, and storing the switching identifier and a switching record corresponding to the switching identifier.

With reference to the second aspect or the first possible implementation of the second aspect, in a third possible implementation of the second aspect, after the sending a first update authorization parameter to the second terminal device, the method further includes obtaining a mode restoration indication, where the mode restoration indication is used to indicate a V2X control function to restore the communication mode of the second V2X service to the first communication mode, determining, based on information included in the mode restoration indication, the second V2X service that needs to be switched from the second communication mode back to the first communication mode, and the second terminal device to which the second V2X service belongs, and sending a second update authorization parameter to the second terminal device, where the second update authorization parameter is used to indicate the second terminal device to switch the communication mode of the second V2X service from the second communication mode back to the first communication mode.

With reference to the third possible implementation of the second aspect, in a fourth possible implementation of the second aspect, the determining, based on information included in the mode restoration indication, the second V2X service that needs to be switched from the second communication mode back to the first communication mode, and the second terminal device to which the second V2X service belongs includes obtaining the switching identifier and the device identifier from the mode restoration indication, obtaining the service identifier and a communication mode that correspond to the switching identifier, determining the second terminal device based on the device identifier obtained from the mode restoration indication, determining the second V2X service based on the service identifier corresponding to the switching identifier, and determining the second communication mode based on the communication mode corresponding to the switching identifier.

With reference to any one of the second aspect or the first to the fourth possible implementations of the second aspect, in a fifth possible implementation of the second aspect, the first update authorization parameter includes a mode indication, and the mode indication is used to indicate, to an upper-layer application of a terminal device, that the communication mode of the second V2X service is switched to the second communication mode together.

According to a third aspect, this application provides still another communication mode switching method, and the method includes receiving a first update authorization parameter, and switching a communication mode of a second V2X service from a first communication mode to a second communication mode according to an indication of the first update parameter, where the second communication mode is different from the first communication mode.

With reference to the third aspect, in a first possible implementation of the third aspect, before the receiving a first update authorization parameter, the method further includes sending a measurement report, where the measurement report includes event indication information, and the event indication information is used to indicate that a radio resource of the first communication mode cannot meet a transmission requirement of transmitting a first V2X service by a first terminal using the first communication mode. The sending a measurement report includes periodically reporting the measurement report based on a configured reporting period in a measurement configuration, or reporting the measurement report when a configured trigger condition in the measurement configuration is met.

With reference to the third aspect or the first possible implementation of the third aspect, in a second possible implementation of the third aspect, after the receiving a first update authorization parameter, the method further includes obtaining a mode indication from the first update authorization parameter, where the mode indication is used to indicate, to an upper-layer application of a terminal device, that the communication mode of the second V2X service is switched to the second communication mode together.

With reference to the second possible implementation of the third aspect, in a third possible implementation of the third aspect, the method further includes transmitting the second V2X service using a communication module corresponding to the second communication mode.

With reference to any one of the third aspect or the first to the third possible implementations of the third aspect, in a fourth possible implementation of the third aspect, after the switching a communication mode of the second V2X service from a first communication mode to a second communication mode, the method further includes receiving a second update authorization parameter, and switching the communication mode of the second V2X service from the second communication mode back to the first communication mode according to an indication of the second update parameter.

According to a fourth aspect, this application further provides a communication mode switching apparatus, and the apparatus includes unit modules configured to indicate the method steps in the first aspect or the implementations of the first aspect, such as a receiving unit, a processing unit, and a sending unit. The receiving unit is configured to receive a measurement report sent by a first terminal device. The processing unit is configured to, if the measurement report includes event indication information, determine a second V2X service that is of a second terminal device and that needs to be switched from a first communication mode to a second communication mode, where the event indication information is used to indicate that a radio resource of the first communication mode cannot meet a transmission requirement of transmitting a first V2X service by the first terminal using the first communication mode, and the second communication mode is different from the first communication mode. The sending unit is configured to send a mode switching indication to a V2X control function, or send a first update authorization parameter to the second terminal device, where the mode switching indication is used to indicate the V2X control function to switch a communication mode of the second V2X service of the second terminal device to the second communication mode, and the first update authorization parameter is used to indicate the second terminal device to switch the communication mode of the second V2X service to the second communication mode. The receiving unit, the processing unit, the sending unit, and the like may be implemented by a processor, a memory, and a communication module in the communication mode switching apparatus.

According to a fifth aspect, this application further provides another communication mode switching apparatus, and the apparatus includes unit modules configured to indicate the method steps in the second aspect or the implementations of the second aspect, such as a receiving unit, a processing unit, and a sending unit. The receiving unit is configured to obtain a mode switching indication. The processing unit is configured to determine, based on information included in the mode switching indication, a second V2X service that needs to be switched from a first communication mode to a second communication mode, and a second terminal device to which the second V2X service belongs. The sending unit is configured to send a first update authorization parameter to the second terminal device, where the first update authorization parameter is used to indicate the second terminal device to switch a communication mode of the second V2X service from the first communication mode to the second communication mode. The receiving unit, the processing unit, the sending unit, and the like may be implemented by a processor, a memory, and a communication module in the communication mode switching apparatus.

According to a sixth aspect, this application further provides another communication mode switching apparatus, and the apparatus includes unit modules configured to indicate the method steps in the third aspect or the implementations of the third aspect, such as a receiving unit, a processing unit, and a sending unit. The receiving unit is configured to receive a first update authorization parameter. The processing unit is configured to switch a communication mode of a second V2X service from a first communication mode to a second communication mode according to an indication of the first update parameter, where the second communication mode is different from the first communication mode. The receiving unit, the processing unit, the sending unit, and the like may be implemented by a processor, a memory, and a communication module in the communication mode switching apparatus.

According to a seventh aspect, this application further provides a communications device, and the communications device may include a processor, a communication module, and a memory. The memory stores an instruction, and the processor may execute the instruction to implement the following functions. The communications module is configured to receive a measurement report sent by a first terminal device. The processor is configured to, if the measurement report includes event indication information, determine a second V2X service that is of a second terminal device and that needs to be switched from a first communication mode to a second communication mode, where the event indication information is used to indicate that a radio resource of the first communication mode cannot meet a transmission requirement of transmitting a first V2X service by the first terminal using the first communication mode, and the second communication mode is different from the first communication mode. The communication module is configured to send a mode switching indication to a V2X control function, or send a first update authorization parameter to the second terminal device, where the mode switching indication is used to indicate the V2X control function to switch a communication mode of the second V2X service of the second terminal device to the second communication mode, and the first update authorization parameter is used to indicate the second terminal device to switch the communication mode of the second V2X service to the second communication mode. Alternatively, the following functions may be implemented. The communication module is configured to obtain the mode switching indication. The processor is configured to determine, based on information included in a mode switching indication, a second V2X service that needs to be switched from a first communication mode to a second communication mode, and a second terminal device to which the second V2X service belongs. The communication module is further configured to send a first update authorization parameter to the second terminal device, where the first update authorization parameter is used to indicate the second terminal device to switch a communication mode of the second V2X service from the first communication mode to the second communication mode.

According to an eighth aspect, this application further provides a terminal device, and the terminal device may include a processor, a communication module, and a memory. The memory stores an instruction, and the processor may execute the instruction to implement the following functions. The communication module is configured to receive a first update authorization parameter. The processor is configured to switch a communication mode of a second V2X service from a first communication mode to a second communication mode according to an indication of the first update parameter, where the second communication mode is different from the first communication mode.

According to a ninth aspect, this application further provides a communications system. The communications system may include any one or any combination of the V2X control function, the PC5-Uu resource scheduling function, the first terminal device, the second terminal device, or the communication mode switching apparatus in the foregoing aspects.

According to a tenth aspect, this application further provides a computer readable storage medium. The computer readable storage medium stores an instruction, and when the instruction is run on a computer, the computer is enabled to perform the all or some steps in the methods described in the foregoing aspects.

According to an eleventh aspect, this application further provides a computer program product including an instruction, and when the computer program product is run on a computer, the computer is enabled to perform the methods described in the foregoing aspects.

According to the method, the network side device, the terminal device, and the like in this application, the communication mode of the second V2X service is switched from the first communication mode to the second communication mode such that a radio resource used for transmitting the first V2X service using the first communication mode can be scheduled for the first V2X service. When the first communication mode is the PC5 communication mode, a case caused by a limited quantity of PC5 interface resources in V2V communication can be reduced, such as resource congestion, insufficiency of bandwidth, or deterioration of signal quality.

BRIEF DESCRIPTION OF DRAWINGS

To describe the technical solutions of this application more clearly, the following briefly describes the accompanying drawings required for describing the embodiments. A person of ordinary skill in the art may still derive other drawings from these accompanying drawings without creative efforts.

DESCRIPTION OF EMBODIMENTS

Figure 1:
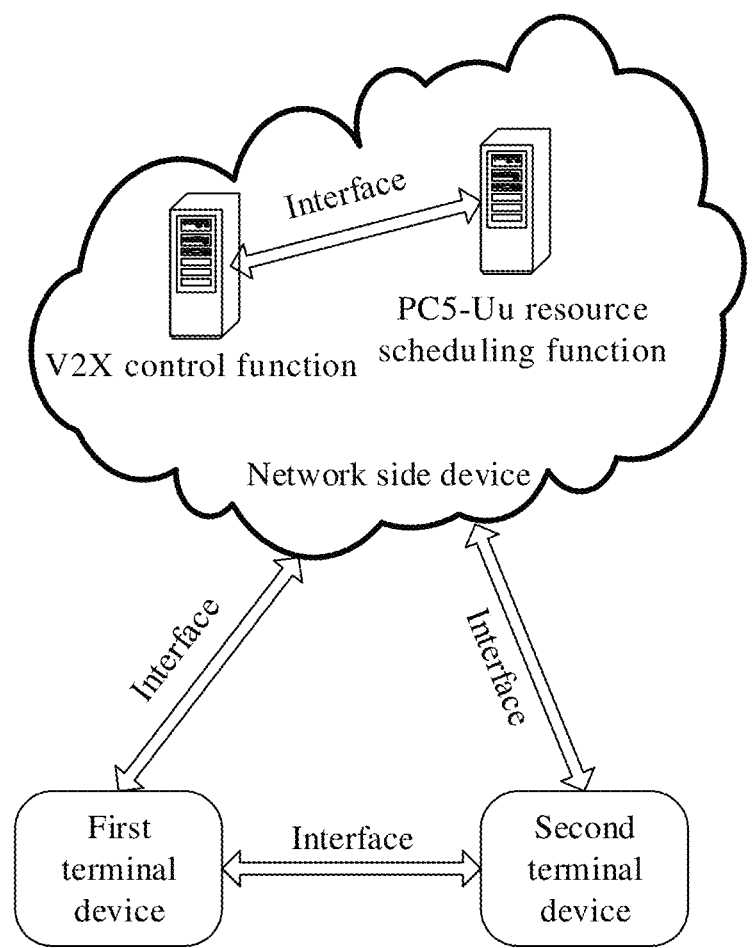
FIG. 1 is a schematic structural diagram of an embodiment of a communications system according to this application.

FIG. 1 is a schematic structural diagram of an embodiment of a communications system according to this application.

As shown in FIG. 1, the communications system may be a V2X communications system, including a V2X control function and a PC5-Uu resource scheduling function. The PC5-Uu resource scheduling function may be a part of the V2X control function or the V2X control function, or may be independent of the V2X control function. In other words, the V2X control function may be located on a same network side device, or may be located on different network side devices.

In a specific implementation, when being located in the V2X control function, the PC5-Uu resource scheduling function may have an external interface with an evolved Node B (eNodeB), and have an internal interface with another function module in the V2X control function. The PC5-Uu resource scheduling function may be alternatively located in the eNodeB. When being located in the eNodeB, the PC5-Uu resource scheduling function may have an external interface with the V2X control function. The PC5-Uu resource scheduling function may be alternatively located in another network element in the communications system. When being located in the other network element in the communications system, the PC5-Uu resource scheduling function may have external interfaces with both the eNodeB and the V2X control function.

In addition to the internet of vehicles control function entity and the PC5-Uu resource scheduling function, the communications system may further include at least one terminal device. The terminal device may be an internet of vehicles terminal device such as a vehicle, or may be another mobile terminal. This is not limited in this application.

The terminal devices may communicate with each other at least using a first communication mode or a second communication mode. The first communication mode is different from the second communication mode, and the two communication modes use different radio resources. Usually, the first communication mode and the second communication mode use different interfaces. For example, if the first communication mode is a PC5 communication mode, the second communication mode may be a Uu communication mode, and if the first communication mode is a Uu communication mode, the second communication mode may be a PC5 communication mode. In the Uu communication mode, communication is performed using an LTE-Uu interface, and in the PC5 communication mode, communication is performed using a PC5 interface.

Figure 2:
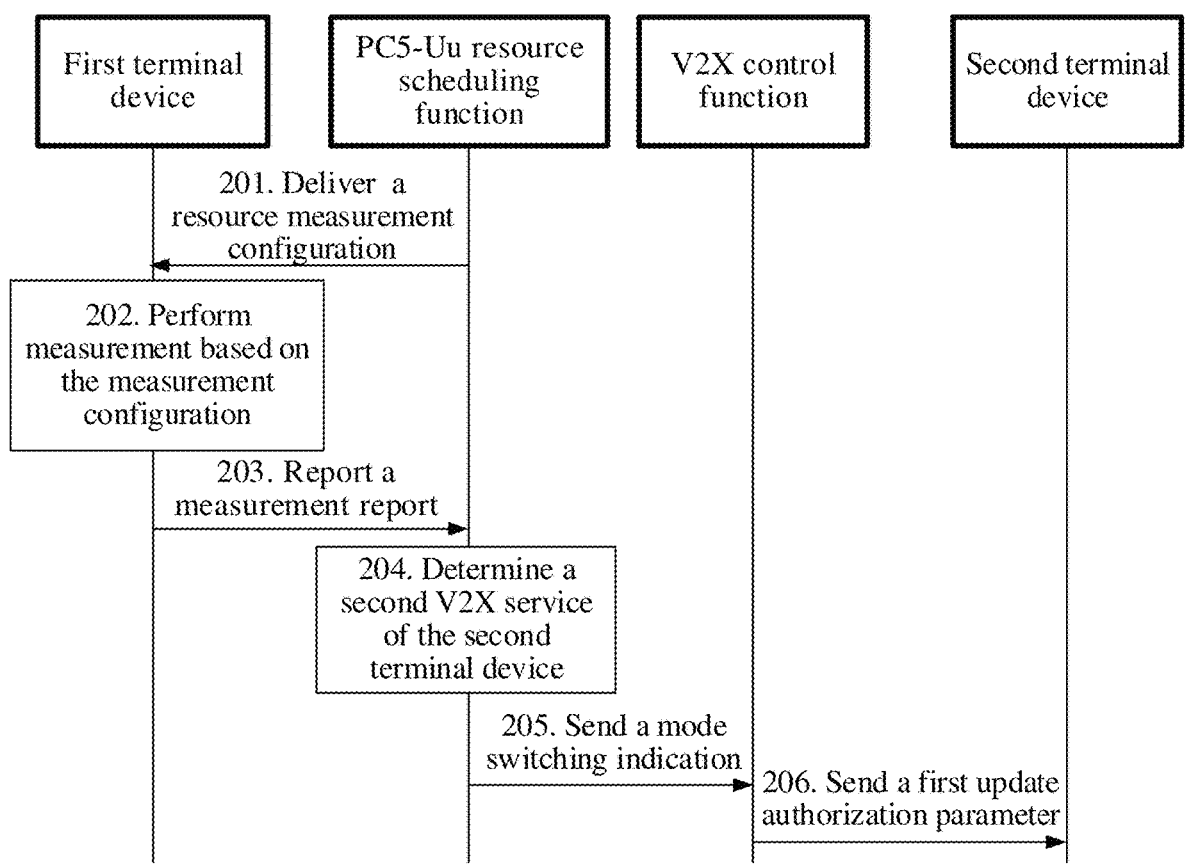
FIG. 2 is a flowchart of an embodiment of a communication mode switching method according to this application.

FIG. 2 is a schematic flowchart of an embodiment of a communication mode switching method according to this application. The following describes this application with reference to FIG. 2 using an example in which the PC5-Uu resource scheduling function is independent of the V2X control function.

Step 201. The PC5-Uu resource scheduling function delivers a resource measurement configuration to a first terminal device in a process in which the first terminal device accesses a network.

The measurement configuration is used to configure a measurement manner in which the first terminal device measures a radio resource. The radio resource is available for transmitting a first V2X service by the first terminal device. The measurement configuration may include information such as a measurement object, a measurement period, a measurement event, and a threshold parameter. The measurement configuration may further include reporting condition information such as a reporting period or a trigger condition used to indicate a condition in which a terminal device needs to report a measurement report.

Step 202. When initiating the first V2X service, the first terminal device performs measurement based on the measurement configuration.

If the first terminal device needs to initiate the first V2X service and needs to transmit the first V2X service using a first communication mode, the first terminal device may measure a target radio resource based on the measurement configuration. The target radio resource is a radio resource allocated for transmitting the first V2X service using the first communication mode, or a radio resource that may be used for transmitting the first V2X service using the first communication mode. In brief, the target radio resource may be a radio resource of the first communication mode. In an embodiment, the target radio resource may be a radio resource allocated for transmitting, using the first communication mode, a plurality of services including the first V2X service communication mode. Alternatively, the target radio resource may be a radio resource allocated for transmitting, using the first communication mode, all V2X services of the first terminal device communication mode. This is not limited in this application.

Usually, according to different application scenarios and different first V2X services, types of the target radio resources are also different. Usually, the target radio resource may be a radio resource required for transmitting data using a PC5 interface, or may be a radio resource required for performing communication using a Uu interface, or may be a radio resource required for transmitting data using another interface. In a V2X communications system, the target radio resource may be usually a radio resource that needs to be used to transmit data using the PC5 interface.

For example, if it is predetermined that data of the first V2X service is transmitted using a PC5 communication mode, when initiating the first V2X service, the first terminal device may measure, based on the measurement configuration, a radio resource used to transmit data using the PC5 communication mode.

Step 203. The first terminal device reports a measurement report to the PC5-Uu resource scheduling function.

The first terminal device may generate the measurement report based on a measurement result of the target radio resource, and then send the measurement report to the PC5-Uu resource scheduling function. The first terminal device may report the measurement report when a reporting condition indicated by the reporting condition information is met. For example, the first terminal device may periodically report the measurement report based on a configured reporting period in the measurement configuration, or report the measurement report when a configured trigger condition of the measurement configuration is met.

When the target radio resource cannot meet a data transmission requirement of the first V2X service, the measurement report may include event indication information. In an embodiment, the event indication information may be used to indicate that the radio resource of the first communication mode cannot meet a transmission requirement of transmitting the first V2X service by the first terminal using the first communication mode.

There may be a plurality of cases in which the target radio resource cannot meet the data transmission requirement of transmitting the first V2X service by the first terminal using the first communication mode. The following cases may be further included. There is no radio resource available for transmitting the first V2X service using the first communication mode, a quantity of radio resources that can be used for transmitting the first V2X service using the first communication mode is too small or signal quality is too poor, and consequently, the transmission requirement of the first V2X service cannot be met, or the like.

Because the first communication mode may be the PC5 communication mode or a Uu communication mode, the target radio resource may be a radio resource required for transmitting the first V2X service using the PC5 communication mode, or may be a radio resource required for transmitting the first V2X service using the Uu communication mode. Therefore, insufficiency of the target radio resource may be that the radio resource required for communication using the PC5 interface is insufficient or the radio resource required for communication using the Uu interface is insufficient. Therefore, the event indication information may be used to indicate only insufficiency of the target radio resource, or may indicate a type of radio resources to which the target radio resource belongs in addition to indicating the insufficient target radio resource.

Specific content of the event indication information and meaning identified by the time indication information may be predetermined. For example, the event indication information may be an event P1. In an embodiment, regardless of whether the target radio resource is the radio resource required for transmitting the first V2X service using the PC5 communication mode or the radio resource required for transmitting the first V2X service using the Uu communication mode, insufficiency of the target radio resource is indicated by the event P1. Alternatively, the event P1 may be used to indicate that a radio resource required for transmitting the first V2X service using the PC5 interface is insufficient, and other event indication information is used to indicate that a radio resource required for transmitting the first V2X service using the Uu interface or another interface is insufficient. This is not limited in this application.

In addition to the event indication information, the measurement report may include a device identifier of the first terminal device and a service identifier (service ID) of the first V2X service. The service identifier uniquely identifies one service, and the device identifier uniquely identifies one terminal device. Therefore, the measurement report includes the device identifier of the first terminal device and the service identifier of the first V2X service such that the PC5-Uu resource scheduling function and another device or function in the communications system may determine which terminal device is the first terminal device, and which service is the first V2X service.

For example, the device identifier of the first terminal device is Vehicle A, the service identifier of the first V2X service is 12, and it is predetermined that data of the first V2X service is transmitted using the PC5 communication mode. If the first terminal device finds, through measurement when initiating the first V2X service, that a radio resource required for transmitting data of the first V2X service using the PC5 communication mode is insufficient, the first terminal device may send the measurement report to the PC5-Uu resource scheduling function. The measurement report includes information such as the event P1, Vehicle A, and 12.

Step 204. The PC5-Uu resource scheduling function determines, based on the measurement report, a second V2X service that needs to be switched from the first communication mode to a second communication mode.

If the measurement report includes the event indication information, the PC5-Uu resource scheduling function may learn, based on the measurement report, that the target radio resource is insufficient. After learning that the target radio resource is insufficient, the PC5-Uu resource scheduling function may determine, based on a preset switching policy, the second V2X service that needs to be switched from the first communication mode to the second communication mode, and a second terminal device to which the second V2X service belongs. The switching policy may be determined based on a radio resource management condition, quality of service (QoS) of a V2X service, an RSU deployment condition, or the like.

The PC5-Uu resource scheduling function may determine, based on information such as a data transmission priority of a terminal device, a data transmission priority of a V2X service, or a priority of transmitting data of the V2X service using the first communication mode, the second V2X service that needs to be switched from the first communication mode to the second communication mode, and the second terminal device to which the second V2X service belongs.

For example, the PC5-Uu resource scheduling function may select, as the second terminal device, one from a terminal device whose data transmission priority is lower than a data transmission priority of the first terminal device, and then select one from a V2X service of the second terminal device as the second V2X service. Alternatively, the PC5-Uu resource scheduling function may directly use the first terminal device as the second terminal device, and then select, as the second V2X service, one from a V2X service whose data is transmitted using the first communication mode and whose data transmission priority is lower than a data transmission priority of the first V2X service. Alternatively, the PC5-Uu resource scheduling function may directly use the first terminal device as the second terminal device, and use the first V2X service as the second V2X service.

It should be noted herein that, in this application, the second V2X service and the first V2X service may be a same service, or may be different services. When the second V2X service and the first V2X service are different services, the second V2X service and the first V2X service may be services of different terminal devices, or may be services of a same terminal device, in other words, the first V2X service and the second V2X service may be different services of the first terminal device.

Step 205. The PC5-Uu resource scheduling function sends a mode switching indication to the V2X control function.

A communication mode used by a terminal device to transmit a V2X service is authorized and adjusted by the V2X control function. Therefore, after determining the second terminal device and the second V2X service, the PC5-Uu resource scheduling function may send the mode switchindication (mode switch indication) to the V2X control function.

The mode switch indication may be used to indicate the V2X control function to switch a communication mode of the second V2X service. Usually, the mode switching indication may be used to indicate the V2X control function to send a first update authorization parameter to the second terminal device in order to adjust the communication mode of the second V2X service using the first update authorization parameter.

To enable the V2X control function to switch the communication mode of the second V2X service, the mode switching indication may include information such as a device identifier of the second terminal device, a service ID of the second V2X service, and a first switching command. The first switching command is used to indicate to switch the communication mode of the second V2X service to the second communication mode. Specific content of the first switching command may vary with different second communication modes.

The information included in the mode switching indication may enable the V2X control function to learn which terminal device is the second terminal device, which service is the second V2X service, and a communication mode to which the communication mode of the second V2X service needs to be switched. The first switching command may be used to indicate only the communication mode to which the communication mode of the second V2X service needs to be switched, and does not need to indicate a current communication mode of the second V2X service. For example, the first switching command may be PC5-Uu, and is further used to indicate to switch the communication mode of the second V2X service from the PC5 communication mode to the Uu communication mode. Alternatively, the first switching command may be Uu-PC5, and is further used to indicate to switch the communication mode of the second V2X service from the Uu communication mode to the PC5 communication mode. Alternatively, the first switching command may be Uu, and is used to indicate to switch the communication mode of the second V2X service from the current mode to the Uu communication mode.

In addition to the device identifier of the second terminal device, the service ID of the second V2X service, and the first switching command, the mode switching indication may further include a switching identifier (switching ID), where the switching identifier may be used to indicate related information of current mode switching. For example, the switching identifier is used to indicate a switching record, and the switching record is used to record the service identifier of the second V2X service and the first switching command, detection duration, a switch moment at which the communication mode of the second V2X service is switched from the first communication mode to the second communication mode, and the like. Both the V2X control function and the PC5-Uu resource scheduling function may store the switching identifier and the switching record corresponding to the switching identifier.

The switching identifier may be unique to the second terminal device. In an embodiment, the second terminal device uniquely corresponds to one switching identifier each time the communication mode of the V2X service is switched. Using the switching identifier, the PC5-Uu resource scheduling function or the V2X control function may obtain information such as the service ID of the second V2X service and the first switching command. The switching identifier may be globally unique to the communications system. In an embodiment, in the communications system, each terminal device uniquely corresponds to one switching identifier each time a mode is switched. When the switching identifier may be globally unique to the communications system, the switching record may further include the device identifier of the second terminal device and device identifier information of the first terminal device. Using the switching identifier, the V2X control function and the PC5-Uu resource scheduling function may obtain related information such as the device identifier of the second terminal device, the service ID of the second V2X service, and the first switching command.

For example, if the device identifier of the second terminal device is Vehicle B, the service identifier of the second V2X service is 11, the first switching command is PC5-Uu, and the switching identifier of the current mode switch is switch 1, the mode switching indication may include Vehicle B, 11, PC5-Uu, and switch 1, or may include only Vehicle B, 11, and PC5-Uu.

Step 206. The V2X control function sends the first update authorization parameter to the second terminal device.

After receiving the mode switching indication sent by the PC5-Uu resource scheduling function, the V2X control function may determine the second terminal device and the second V2X service based on the mode switching indication, and generate the first update authorization parameter. Then, the V2X control function sends the first update authorization parameter to the second terminal device such that the second terminal device switches the communication mode of the second V2X service to the second communication mode according to an indication of the update authorization parameter. The first update authorization parameter may be used to indicate the second terminal device to switch the communication mode of the second V2X service from an original communication mode to the second communication mode.

For example, the V2X control function determines the second terminal device based on the device identifier obtained from the mode switching indication, determines the second V2X service based on the service identifier obtained from the mode switching indication, and determines the second communication mode based on the first switching command obtained from the mode switching indication.

An authorization parameter format specified in the 3rd Generation Partnership Project (3GPP) TS24.386 is used as an example. The Authorized V2X Service List in the V2X over PC5 parameter item is used to indicate all V2X services that need to be transmitted using the PC5 communication mode, and the Authorized V2X Service List in the V2X over LTE-Uu parameter item is used to indicate all V2X services that need to be transmitted using the Uu communication mode.

Therefore, if the service ID of the second V2X service is 11, and the first communication mode preallocated to the second V2X service is the PC5 communication mode, in authorization parameters preconfigured for the second terminal device, the Authorized V2X Service List in the V2X over PC5 parameter item includes the service identifier 11 of the second V2X service, and the Authorized V2X Service List in the V2X over LTE-Uu parameter item does not include the service identifier 11 of the second V2X service.

If the communication mode of the second V2X service needs to be switched to the Uu communication mode, the service identifier 11 of the second V2X service included in the Authorized V2X Service List in the V2X over PC5 parameter item needs to be deleted using the first update authorization parameter, and the service identifier 11 of the second V2X service needs to be added to the Authorized V2X Service List in the V2X over LTE-Uu parameter item.

When the mode switching indication further includes the switching identifier, the V2X control function may further store a correspondence between the switching identifier and the device identifier, the service identifier, and the first switching command that are included in the mode switching indication, in other words, the V2X control function may further store a correspondence between the mode switching indication and the device identifier of the second terminal device, the service identifier of the second V2X service, and the first switching command.

The 3GPP protocol specifies that an upper-layer application of a terminal device determines a communication mode used for a V2X service. However, the upper-layer application of the terminal device cannot learn which communication mode is actually authorized for data transmission of the V2X service. Therefore, after switching the communication mode of the second V2X service to the second communication mode, the second terminal device initiates a service authorization process for the second V2X service again. For example, if an application layer of the second terminal device determines to use the PC5 mode to transmit the second V2X service, but if the communication mode of the second V2X service is switched to another communication mode other than a PC5 communication mode, the second terminal device may query an authorization parameter in a process of transmitting the second V2X service, and the authorization parameter cannot be queried. If the authorization parameter cannot be queried, the second terminal device initiates the service authorization process for the second V2X service again.

To prevent the second terminal device from initiating the service authorization for the second V2X service again, the first update authorization parameter may further include a parameter item a mode indication (ModeIndication), to indicate, to the upper-layer application of the terminal device, that the communication mode of the second V2X service has been switched to the second communication mode. The ModeIndication parameter item may include indication information such as Uu indication (UuIndication) and PC5 indication (PC5Indication). UuIndication is used to indicate a service whose data is transmitted using the Uu communication mode, and PC5Indication is used to indicate a service whose data is transmitted using the PC5 communication mode. The ModeIndication parameter item has a higher priority than the V2XoverLTEUu parameter item and the V2X over PC5 parameter item. Therefore, an upper-layer application of the second terminal device may invoke, according to an indication of the ModeIndication parameter item, a transmission module corresponding to the second communication mode to transmit service data of the second V2X service, and no longer invoke the transmission module according to an indication of the V2X over LTE-Uu parameter item or the V2X over PC5 parameter item.

For example, if the communication mode of the second V2X service is switched to the Uu communication mode, the UuIndication may include the service identifier 11 of the second V2X service, and the PC5Indication does not include the service identifier 11 of the second V2X service.

After mode switching, a communication mode actually used by the second V2X service is different from a communication mode determined by the second terminal device. Therefore, after the communication mode of the second V2X service is switched from the first communication mode to the second communication mode, if a predetermined condition is met, the communication mode of the second V2X service may be further switched back to the first communication mode.

The PC5-Uu resource scheduling function may switch the communication mode of the second V2X service from the second communication mode back to the first communication mode in a manner similar to that in the foregoing embodiment. Switching of the communication mode of the second V2X service from the second communication mode back to the first communication mode may be implemented in the mode switching process in the foregoing embodiment, or may be implemented by sending a mode restoration indication. The following further describes switching of the communication mode of the second V2X service from the second communication mode back to the first communication mode by sending the mode restoration indication.

Figure 3:
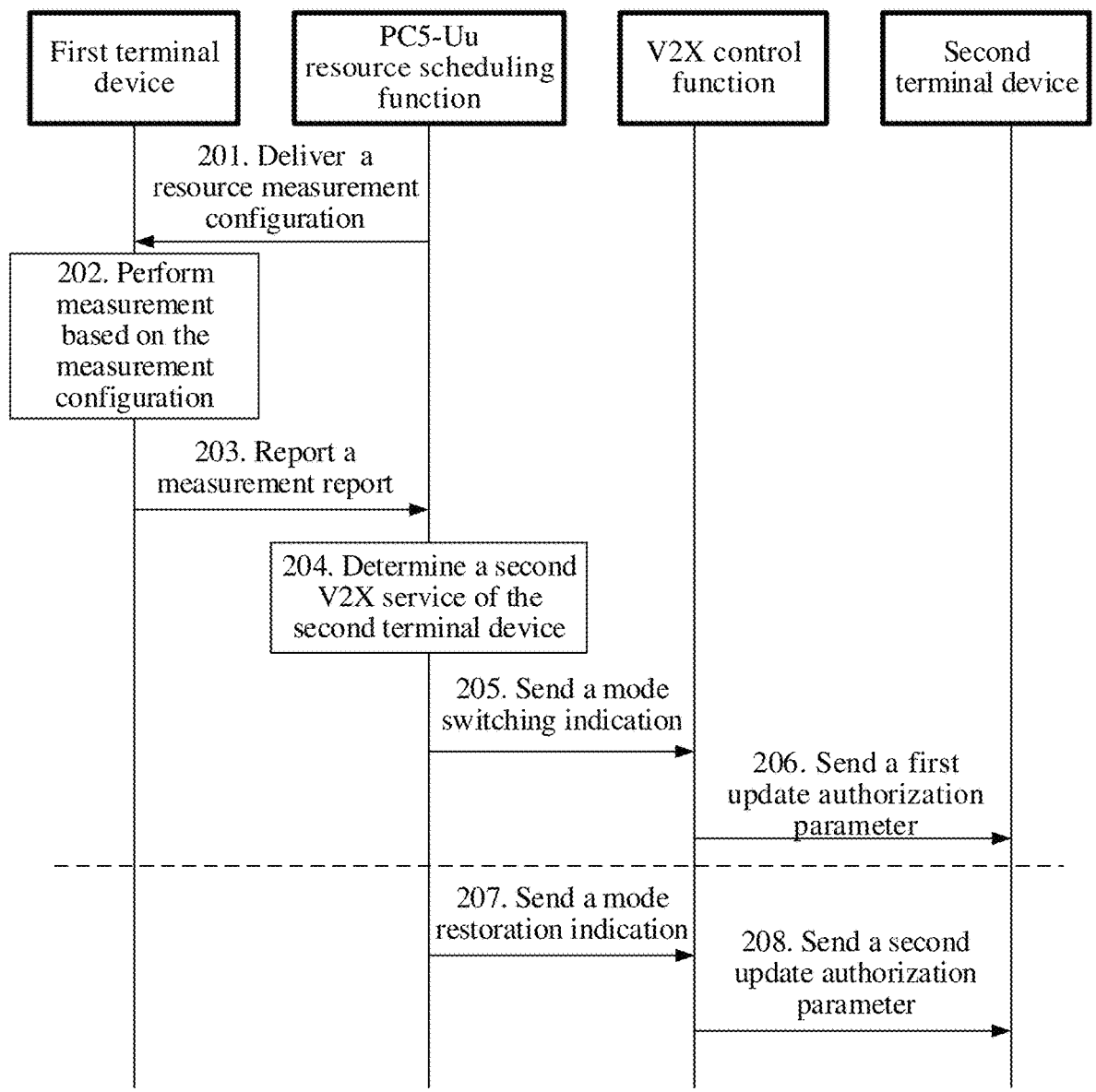
FIG. 3 is a flowchart of another embodiment of a communication mode switching method according to this application.

FIG. 3 is a flowchart of another embodiment of a communication mode switching method according to this application. As shown in FIG. 3, after step 206, the method may further include the following steps.

Step 207. The PC5-Uu resource scheduling function sends a mode restoration indication to the V2X control function.

When a predetermined condition is met, the PC5-Uu resource scheduling function may send the mode restoration indication to the V2X control function. The mode restoration indication may be a deletion mode switch request (delete mode switch request). The predetermined condition may be that data of the first V2X service is not transmitted for a time exceeding detection duration. The detection duration may be determined by the PC5-Uu resource scheduling function before the PC5-Uu resource scheduling function sends the mode switching indication to the V2X control function. The detection duration may vary with different first V2X services. The detection duration may also be set in another manner. For example, the detection duration may also be preset by the communications system.

After switching the communication mode of the second V2X service from the first communication mode to the second communication mode, the PC5-Uu resource scheduling function may start a timer, and duration of the timer may be the detection duration. After switching the communication mode of the second V2X service from the first communication mode to the second communication mode, if the data of the first V2X service is not transmitted for a time exceeding the detection duration, or although the data is transmitted, the data of the first V2X service is not transmitted again after the detection duration expires, the PC5-Uu resource scheduling function sends the mode restoration indication to the V2X control function.

The mode restoration indication may include the device identifier of the second terminal device, the service ID of the second V2X service, a second switching command, and the like. The second switching command is used to indicate to switch the communication mode of the second V2X service back to the first communication mode. Alternatively, when the switching identifier is globally unique to the communications system, the mode restoration indication may include only the switching identifier. When the switching identifier is unique to the second terminal device, the mode restoration indication may include the switching identifier and the device identifier of the second terminal device. It should be noted herein that the second switching command is different from the first switching command only in content, and therefore the second switching command is not described in detail again. For related parts, refer to related content of the first switching command.

Step 208. The V2X control function sends a second update authorization parameter to the second terminal device.

After receiving the mode restoration indication sent by the PC5-Uu resource scheduling function, the V2X control function determines the second terminal device and the second V2X service based on the mode restoration indication, and generates the second update authorization parameter. Then, the V2X control function sends the second update authorization parameter to the second terminal device such that the second terminal device switches the communication mode of the second V2X service back to the first communication mode according to an indication of the update authorization parameter.

The V2X control function may obtain the switching identifier and the device identifier from the mode restoration indication, obtain the service identifier and a communication mode that correspond to the switching identifier from the stored switching record, determine the second terminal device based on the device identifier obtained from the mode restoration indication, determine the second V2X service based on the service identifier corresponding to the switching identifier, and determine the second communication mode based on the communication mode corresponding to the switching identifier. It should be noted herein that the device identifier of the second terminal device may be alternatively obtained by the V2X control function from the mode restoration indication.

For example, if the mode restoration indication includes Vehicle B, 11, and Uu-PC5, the V2X control function may determine that a communication mode of a service whose service identifier is 11 on a terminal device whose terminal device identifier is Vehicle B needs to be restored from the Uu communication mode to the PC5 communication mode. For another example, if the mode restoration indication includes switch 1, the V2X control function may query corresponding mode switch in switch 1, and further obtain a device identifier, a service identifier, and a second switching command that correspond to the mode switch in order to determine a specific terminal, a service of the terminal device that needs to be restored, an original communication mode of the service, and a communication mode to which the service needs to be restored.

It should be noted herein that, because manners of generating and sending the mode restoration indication are similar to manners of generating and sending the mode switching indication, specific processes of generating and sending the mode restoration indication are not described herein again. For similar parts, refer to related content of generation and sending of the mode switching indication. Similarly, manners of generating and sending the second update authorization parameter are similar to manners of generating and sending the first update authorization parameter. Therefore, specific processes of generating and sending the second update authorization parameter are not described herein again. For similar parts, refer to related content of generation and sending of the first update authorization parameter. Details are not described herein again. When the mode restoration indication includes the device identifier of the second terminal device, the service ID of the second V2X service, and the second switching command, the communication mode of the second V2X service is switched from the second communication mode back to the first communication mode, which may also be considered as switching of the communication mode of the second V2X service.

In this embodiment, the communication mode of the second V2X service is switched from the first communication mode to the second communication mode such that a radio resource used for transmitting the first V2X service using the first communication mode can be scheduled for the first V2X service. When the first communication mode is the PC5 communication mode, resource congestion, insufficiency of bandwidth, deterioration of signal quality, or the like in V2V communication that are caused by the limited quantity of PC5 interface resources are reduced.

Figure 4:
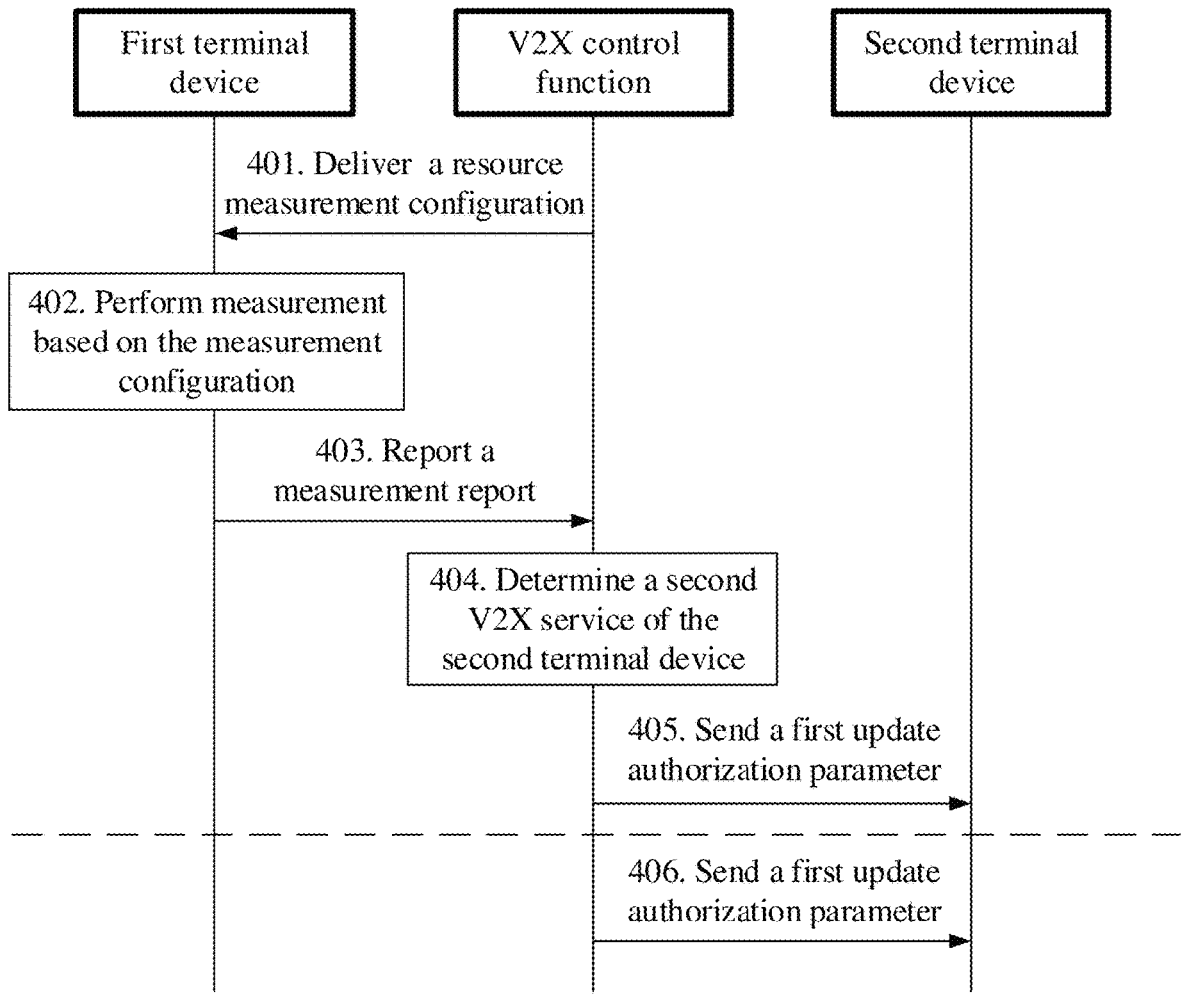
FIG. 4 is a flowchart of still another embodiment of a communication mode switching method according to this application.

FIG. 4 is a flowchart of another embodiment of a communication mode switching method according to this application. With reference to FIG. 4, the following describes this application using an example in which the PC5-Uu resource scheduling function is a part of the V2X control function or the V2X control function, in other words, the PC5-Uu resource scheduling function and the V2X control function are a same device.

Step 401. The V2X control function delivers a resource measurement configuration to a first terminal device in a process in which the first terminal device accesses a network.

Step 402. When initiating a first V2X service, the first terminal device performs measurement based on the measurement configuration.

Step 403. The first terminal device reports a measurement report to the V2X control function.

Step 404. The V2X control function determines, based on the measurement report, a second V2X service that needs to be switched from a first communication mode to a second communication mode.

It should be noted herein that, for specific content of step 401 to step 404, refer to step 201 to step 204, and details are not described herein again.

Step 405. The V2X control function sends a first update authorization parameter to a second terminal device.

Because the V2X control function determines the second V2X service, the V2X control function may directly send the first update authorization parameter to the second terminal device. For a specific process, refer to step 206, and details are not described herein again.

Similarly, after step 405, the method may further include.

Step 406. The V2X control function sends a second update authorization parameter to the second terminal device.

When a predetermined condition is met, the V2X control function may send the second update authorization parameter to the second terminal device. For a specific process of sending the second update authorization parameter, refer to step 206 and step 208. Details are not described herein again.

Corresponding to the communication mode switching method provided in this application, this application further provides a communication mode switching apparatus, a network side device, and a terminal device.

Figure 5:
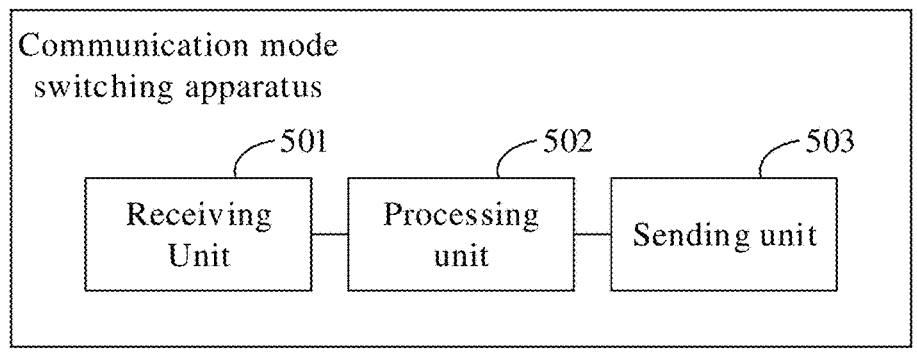
FIG. 5 is a schematic structural diagram of an embodiment of a network side device according to this application.

FIG. 5 is a schematic structural diagram of an embodiment of a network side device according to this application. The network side device may be provided with a V2X control function, and may be alternatively provided with a PC5-Uu resource scheduling function. The network side device may be configured to implement the communication mode switching method that is to be implemented using the V2X control function or the PC5-Uu resource scheduling function in the foregoing embodiment.

As shown in FIG. 5, the network side device may include a receiving unit 501, a processing unit 502, and a sending unit 503.

If the network side device is provided with the PC5-Uu resource scheduling function, the receiving unit 501 may be configured to receive a measurement report sent by a first terminal device. The processing unit 502 may be configured to, if the measurement report includes event indication information, determine a second V2X service that is of a second terminal device and that needs to be switched from a first communication mode to a second communication mode, where the event indication information is used to indicate that a radio resource of the first communication mode cannot meet a transmission requirement of transmitting a first V2X service by the first terminal using the first communication mode, and the second communication mode is different from the first communication mode. The sending unit 503 may be configured to send a mode switching indication to the V2X control function, or send a first update authorization parameter to the second terminal device, where the mode switching indication is used to indicate the V2X control function to switch a communication mode of the second V2X service of the second terminal device to the second communication mode, and the first update authorization parameter is used to indicate the second terminal device to switch the communication mode of the second V2X service to the second communication mode.

Optionally, the mode switching indication includes a device identifier of the second terminal device, a service identifier of the second V2X service, and a first switching command. The first switching command is used to indicate to switch the communication mode of the second V2X service from the first communication mode to the second communication mode.

Optionally, the mode switching indication further includes a switching identifier. The switching identifier is used to indicate a switching record, and the switching record includes the device identifier of the second terminal device, the service identifier of the second V2X service, and the first switching command.

Optionally, the sending unit 503 is further configured to, when a predetermined condition is met, send a mode restoration indication to the V2X control function, or send a second update authorization parameter to the second terminal device. The mode restoration indication is used to indicate the V2X control function to restore the communication mode of the second V2X service to the first communication mode, and the second update authorization parameter is used to indicate the second terminal device to switch the communication mode of the second V2X service back to the first communication mode.

Optionally, the mode restoration indication includes the device identifier of the second terminal device, the service identifier of the second V2X service, and a second switching command. Alternatively, the mode restoration indication includes the switching identifier.

Optionally, the processing unit 502 is further configured to determine detection duration in which the communication mode of the second V2X service is switched from the first communication mode to the second communication mode. The sending unit 503 is further configured to, if data of the first V2X service is not transmitted for a time exceeding the detection duration, send the mode restoration indication to the V2X control function, or send the second update authorization parameter to the second terminal device.

Optionally, the first communication mode is a PC5 communication mode, and the second communication mode is a Uu communication mode, or the first communication mode is a Uu communication mode, and the second communication mode is a PC5 communication mode.

Optionally, the first terminal device and the second terminal device are a same terminal device, or the first V2X service and the second V2X service are a same service.

Optionally, the first update authorization parameter includes a mode indication, and the mode indication is used to indicate, to an upper-layer application of the second terminal device, that the communication mode of the second V2X service is switched to the second communication mode.

If the network side device is provided with the V2X control function, the receiving unit 501 is configured to obtain the mode switching indication. The processing unit 502 is configured to determine, based on information included in the mode switching indication, the second V2X service that needs to be switched from the first communication mode to the second communication mode, and the second terminal device to which the second V2X service belongs. The sending unit 503 is configured to send the first update authorization parameter to the second terminal device, where the first update authorization parameter is used to indicate the second terminal device to switch the communication mode of the second V2X service from the first communication mode to the second communication mode.

Optionally, the processing unit 502 is further configured to determine the second terminal device based on the device identifier obtained from the mode switching indication, determine the second V2X service based on the service identifier obtained from the mode switching indication, and determine the second communication mode based on the first switching command obtained from the mode switching indication.

Optionally, the processing unit 502 is further configured to obtain the switching identifier from the mode switching indication, and store the switching identifier and the switching record corresponding to the switching identifier.

Optionally, the receiving unit 501 is further configured to obtain the mode restoration indication, where the mode restoration indication is used to indicate the V2X control function to restore the communication mode of the second V2X service to the first communication mode. The processing unit 502 is further configured to determine, based on information included in the mode restoration indication, the second V2X service that needs to be switched from the second communication mode back to the first communication mode, and the second terminal device to which the second V2X service belongs. The sending unit 503 is further configured to send the second update authorization parameter to the second terminal device, where the second update authorization parameter is used to indicate the second terminal device to switch the communication mode of the second V2X service from the second communication mode back to the first communication mode.

Optionally, the processing unit 502 is further configured to obtain the switching identifier and the device identifier from the mode restoration indication, obtain the service identifier and a communication mode that correspond to the switching identifier, determine the second terminal device based on the device identifier obtained from the mode restoration indication, determine the second V2X service based on the service identifier corresponding to the switching identifier, and determine the second communication mode based on the communication mode corresponding to the switching identifier.

Optionally, the first update authorization parameter includes a mode indication, and the mode indication is used to indicate, to an upper-layer application of a terminal device, that the communication mode of the second V2X service is switched to the second communication mode together.

In another implementation, the receiving unit 501 is configured to receive a measurement report reported by a first terminal device. The processing unit 502 is configured to determine, based on the measurement report, a second V2X service that needs to be switched from a first communication mode to a second communication mode. The sending unit 503 is configured to send a first update authorization parameter to a second terminal device. Optionally, the sending unit 503 is further configured to send a second update authorization parameter to the second terminal device.

Figure 6:
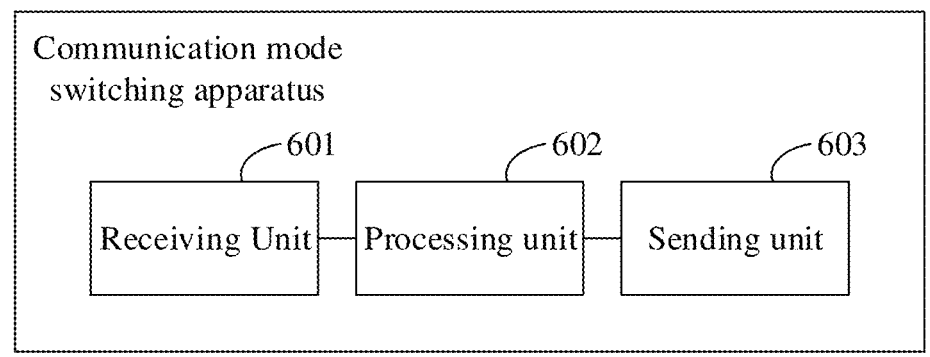
FIG. 6 is a schematic structural diagram of an embodiment of a terminal device according to this application.

FIG. 6 is a schematic structural diagram of an embodiment of a terminal device according to this application. The terminal device is configured to implement the communication mode switching method that is implemented by the network side device in the foregoing embodiment.

As shown in FIG. 6, the terminal device may include a receiving unit 601, a processing unit 602, and a sending unit 603.

The receiving unit 601 may be configured to receive a first update authorization parameter. The processing unit 602 may be configured to switch a communication mode of a second V2X service from a first communication mode to a second communication mode according to an indication of the first update parameter, where the second communication mode is different from the first communication mode.

Optionally, the sending unit 603 is configured to send a measurement report, where the measurement report includes event indication information, and the event indication information is used to indicate that a radio resource of the first communication mode cannot meet a transmission requirement of transmitting a first V2X service by a first terminal using the first communication mode. The sending unit 603 may be further configured to periodically report the measurement report based on a configured reporting period in a measurement configuration, or report the measurement report when a configured trigger condition in the measurement configuration is met.

Optionally, the processing unit 602 is further configured to obtain a mode indication from the first update authorization parameter, where the mode indication is used to indicate, to an upper-layer application of a terminal device, that the communication mode of the second V2X service is switched to the second communication mode together.

Optionally, the sending unit 603 is further configured to transmit the second V2X service using a communications module corresponding to the second communication mode.

Optionally, the receiving unit 601 is further configured to receive a second update authorization parameter. The sending unit 603 is further configured to switch the communication mode of the second V2X service from the second communication mode back to the first communication mode according to an indication of the second update parameter.

Figure 7:
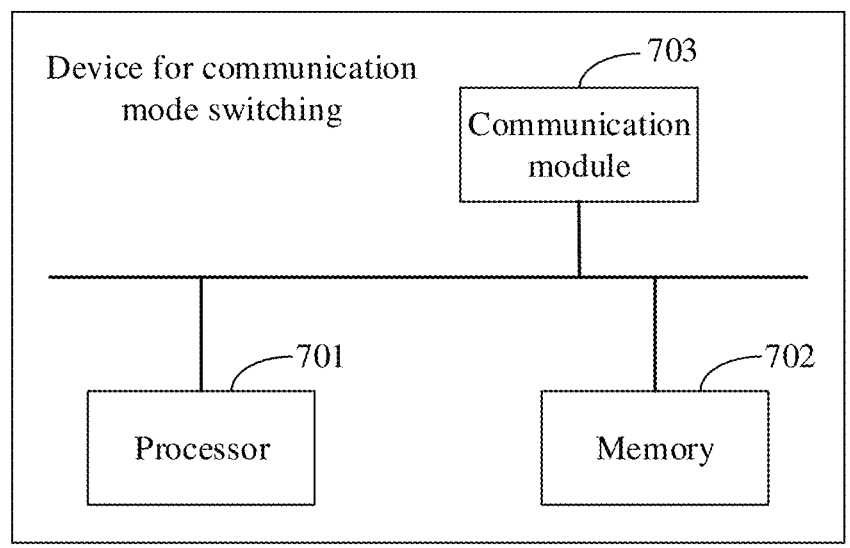
FIG. 7 is a schematic structural diagram of an embodiment of a device used for communication mode switching according to this application.

FIG. 7 is a schematic structural diagram of an embodiment of a device used for communication mode switching according to this application. The device may be the network side device in the foregoing embodiments, or may be the terminal device in the foregoing embodiments. The network side device may be a V2X control function or the PC5-Uu resource scheduling function, or may be another device for implementing the V2X control function or the PC5-Uu resource scheduling function, for example, the network side device shown in FIG. 5. The terminal device may be a first terminal device or a second terminal device, or may be another device, for example, the terminal device shown in FIG. 6.

As shown in FIG. 7, the device may include a processor 701, a memory 702, and a communication module 703.

As a control center of the device, the processor 701 is connected to various parts of the entire device using various interfaces and lines, and performs various functions and/or data processing of the device by running or executing a software program and/or a module stored in the memory and invoking data stored in the memory. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The memory 702 may include a volatile memory, such as a random access memory (RAM), or may include a nonvolatile memory, such as a flash memory, a hard disk drive (HDD), or a solid-state drive (SSD). The memory may alternatively include a combination of the foregoing types of memories. The memory may store an instruction, a program, or code, and the processor of the device may implement a function of the device by executing the program or the code.

The communication module may be configured to implement communication between the device and another device. For example, when the device is a Rich Communication Service (RCS), the communication module may be a common public radio interface (CPRI) configured to implement communication between an RRS and the RCS.

If the device is configured to implement the PC5-Uu resource scheduling function, the processor 701 may be configured to receive, using the communication module 703, a measurement report sent by a first terminal device, if the measurement report includes event indication information, determine a second V2X service that is of a second terminal device and that needs to be switched from a first communication mode to a second communication mode, where the event indication information is used to indicate that a radio resource of the first communication mode cannot meet a transmission requirement of transmitting a first V2X service by the first terminal using the first communication mode, and the second communication mode is different from the first communication mode, and send a mode switching indication to a V2X control function using the communication module 703, or send a first update authorization parameter to the second terminal device, where the mode switching indication is used to indicate the V2X control function to switch a communication mode of the second V2X service of the second terminal device to the second communication mode, and the first update authorization parameter is used to indicate the second terminal device to switch the communication mode of the second V2X service to the second communication mode.

When the device is configured to implement the V2X control function, the processor 701 may be configured to obtain the mode switching indication using the communication module 703, determine, based on information included in the mode switching indication, the second V2X service that needs to be switched from the first communication mode to the second communication mode, and the second terminal device to which the second V2X service belongs, and send the first update authorization parameter to the second terminal device using the communication module 703, where the first update authorization parameter is used to indicate the second terminal device to switch the communication mode of the second V2X service from the first communication mode to the second communication mode.

When the device is the first terminal device, the processor 701 may be configured to receive a resource measurement configuration using the communication module 703, perform measurement based on the measurement configuration, and report the measurement report using the communication module 703.

When the device is the second terminal device, the processor 701 may be configured to receive the first update authorization parameter using the communication module 703, and switch the communication mode of the second V2X service from the first communication mode to the second communication mode according to an indication of the first update parameter, where the second communication mode is different from the first communication mode.

It should be understood that all or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the processes or functions according to the embodiments of the present disclosure are generated. The computer may be a general-purpose computer, a special-purpose computer, a computer network, or another programmable apparatus. The computer instruction may be stored in a computer readable storage medium or may be transmitted from one computer readable storage medium to another computer readable storage medium. For example, the computer instruction may be transmitted from one website, computer, server, or data center to another website, computer, server, or data center wired (for example, a coaxial cable, an optical fiber, or a digital subscriber line (DSL)) or wirelessly (for example, infrared, radio, and microwave). The computer readable storage medium may be any usable medium accessible to a computer, or a data storage device, such as a server or a data center, integrating one or more usable media. The usable medium may be a magnetic medium, for example, a floppy disk, a hard disk, a magnetic tape, or an optical medium, for example, a digital versatile disc (DVD), or a semiconductor medium, for example, a SSD.

For same or similar parts in the embodiments in this specification, refer to each other. Especially, apparatus and network side device embodiments are basically similar to a method embodiment, and therefore are described briefly. For related parts, refer to descriptions in the method embodiment.

The foregoing implementations of the present disclosure do not constitute any limitation on the protection scope of the present disclosure.

What is claimed is:

1. A communication mode switching method, comprising:
receiving, from a first terminal device, a measurement report for a radio resource of a first communication mode;
determining a second vehicle to everything (V2X) service of a second terminal device that needs to be switched from the first communication mode to a second communication mode when the measurement report comprises event indication information, wherein the event indication information indicates that the radio resource cannot meet a transmission requirement of transmitting a first V2X service by the first terminal device using the first communication mode; and sending either a mode switching indication to a V2X control function or a first update authorization parameter to the second terminal device based on the determining;

wherein the mode switching indication indicates the V2X control function is to switch the first communication mode of the second V2X service of the second terminal device to the second communication mode; and wherein the first update authorization parameter indicates to the second terminal device to switch the communication mode of the second V2X service to the second communication mode.

2. The communication mode switching method of claim 1, wherein the mode switching indication comprises a device identifier of the second terminal device, a service identifier of the second V2X service, and a first switching command, and wherein the first switching command indicates to switch from the first communication mode to the second communication mode.

3. The method of claim 2, wherein the mode switching indication further comprises a switching identifier that indicates a switching record.

4. The method of claim 3, wherein the switching record records the device identifier of the second terminal device, the service identifier of the second V2X service, and the first switching command.

5. The communication mode switching method of claim 1, wherein after sending the mode switching indication to the V2X control function, the method further comprises: sending a mode restoration indication to the V2X control function when a predetermined condition is met, wherein the mode restoration indication indicates the V2X control function is to restore the communication mode of the second V2X service to the first communication mode.

6. The communication mode switching method of claim 1, wherein after sending the first update authorization parameter to the second terminal device, the method further comprises sending a second update authorization parameter to the second terminal device when a predetermined condition is met, wherein the second update authorization parameter indicates the second terminal device is to switch the communication mode of the second V2X service back to the first communication mode.

7. The communication mode switching method of claim 1, wherein the first terminal device and the second terminal device are a same terminal device.

8. The communication mode switching method of claim 1, wherein the first V2X service and the second V2X service are a same service.

9. A communication mode switching method, comprising:
obtaining a mode switching indication that indicates that a radio resource of a first communication mode cannot meet a transmission requirement of transmitting a first vehicle to everything (V2X) service by a first terminal device using the first communication mode;

determining, based on information comprised in the mode switching indication, a second V2X service to be switched from the first communication mode to a second communication mode, and a second terminal device, wherein the second terminal device includes the second V2X service; and sending a first update authorization parameter to the second terminal device based on the determining;

wherein the first update authorization parameter indicates the second terminal device is to switch from the first communication mode to the second communication mode.

10. The communication mode switching method of claim 9, wherein the determining comprises:
obtaining a device identifier, a service identifier, and a first switching command from the mode switching indication;
determining the second terminal device based on the device identifier;
determining the second V2X service based on the service identifier; and
determining the second communication mode based on the first switching command.

11. The communication mode switching method of claim 9, wherein after the sending, the method further comprises:
obtaining a mode restoration indication, wherein the mode restoration indication indicates a V2X control function is to restore the communication mode of the second V2X service to the first communication mode;
determining, based on information comprised in the mode restoration indication, the second V2X service that is to be switched from the second communication mode back to the first communication mode and the second terminal device to which the second V2X service belongs; and
sending a second update authorization parameter to the second terminal device, wherein the second update authorization parameter indicates the second terminal device is to switch the communication mode of the second V2X service from the second communication mode back to the first communication mode.

12. The communication mode switching method of claim 11, wherein determining the second V2X service that is to be switched from the second communication mode back to the first communication mode and the second terminal device to which the second V2X service belongs comprises:
obtaining a switching identifier and a device identifier from the mode restoration indication;
obtaining a service identifier that corresponds to the switching identifier and a communication mode that corresponds to the switching identifier;
determining the second terminal device based on the device identifier;
determining the second V2X service based on the service identifier; and
determining the second communication mode based on the communication mode.

13. A network side device, comprising:
a processor configured to determine a second vehicle to everything (V2X) service of a second terminal device to be switched from a first communication mode to a second communication mode when a measurement report for a radio resource of the first communication mode comprises event indication information, wherein the event indication information indicates that the radio resource cannot meet a transmission requirement of transmitting a first V2X service by a first terminal device using the first communication mode; and a transmitter coupled to the processor and configured to send a mode switching indication to a V2X control function or send a first update authorization parameter to the second terminal device;

wherein the mode switching indication indicates the V2X control function is to switch a communication mode of the second V2X service of the second terminal device to the second communication mode; and wherein the first update authorization parameter indicates the second terminal device is to switch the communication mode of the second V2X service to the second communication mode.

14. The network side device of claim 13, wherein the processor is further configured to receive the measurement report from the first terminal device.

15. The network side device of claim 13, wherein the mode switching indication comprises a device identifier of the second terminal device, a service identifier of the second V2X service, and a first switching command, wherein the first switching command indicates to switch the communication mode of the second V2X service from the first communication mode to the second communication mode.

16. The network side device of claim 15, wherein the mode switching indication further comprises a switching identifier, wherein the switching identifier indicates a switching record, and wherein the switching record comprises the device identifier of the second terminal device, the service identifier of the second V2X service, and the first switching command.

17. The network side device of claim 13, wherein the transmitter is further configured to send a mode restoration indication to the V2X control function when a predetermined condition is met, wherein the mode restoration indication indicates the V2X control function is to restore the communication mode of the second V2X service to the first communication mode.

18. The network side device of claim 13, wherein the transmitter is further configured to send a second update authorization parameter to the second terminal device, wherein the second update authorization parameter indicates the second terminal device is to switch the communication mode of the second V2X service back to the first communication mode.

19. The network side device of claim 13, wherein the first terminal device and the second terminal device are a same terminal device.

20. The network side device of claim 13, wherein the first V2X service and the second V2X service are a same service.

* * * * *

UNITED STATES PATENT AND TRADEMARK OFFICE
CERTIFICATE OF CORRECTION

PATENT NO. : 11,218,852 B2  
APPLICATION NO. : 16/725283  
DATED : January 4, 2022  
INVENTOR(S) : Xiaoguang Chen Page 1 of 1

It is certified that error appears in the above-identified patent and that said Letters Patent is hereby corrected as shown below:

On the Title Page

Page 2, (56) References Cited, Other Publications, Column 2, Line 7: "Gallo, L. et al., "Resouice Allocation" should read "Gallo, L. et al., "Resource Allocation"

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*